United States Patent
Yan (10) Patent No.: US 8,477,685 B2
(45) Date of Patent: Jul. 2, 2013

(54) ENHANCED MOBILITY MANAGEMENT AT A MOBILE ACCESS GATEWAY

(75) Inventor: Li Yan, Holmdel, NJ (US)

(73) Assignee: Avaya, Inc., Basking Ridge, NJ (US)

( * ) Notice: Subject to any disclaimer, the term of this patent is extended or adjusted under 35 U.S.C. 154(b) by 834 days.

(21) Appl. No.: 12/512,594

(22) Filed: Jul. 30, 2009

(65) Prior Publication Data

US 2011/0026453 A1 Feb. 3, 2011

(51) Int. Cl.
- *H04W 4/00* (2009.01)
- *H04W 36/00* (2009.01)
- *H04J 3/06* (2006.01)
- *H04L 12/56* (2006.01)

(52) U.S. Cl.
USPC .......... 370/328; 370/349; 370/352; 370/401; 709/245; 455/435.1; 455/436

(58) Field of Classification Search
USPC ......... 370/310, 328–329, 331, 338, 351–357, 370/389, 401, 349; 709/200, 224, 230, 245–246, 709/249–250; 455/435.1, 436–444, 449, 455/517
See application file for complete search history.

(56) References Cited

U.S. PATENT DOCUMENTS

| | | | |
|---|---|---|---|
| 2007/0087748 A1* | 4/2007 | Du et al. | 455/436 |
| 2008/0056252 A1* | 3/2008 | Miao | 370/389 |
| 2008/0316956 A1* | 12/2008 | Turanyi et al. | 370/328 |
| 2009/0168698 A1* | 7/2009 | Weniger et al. | 370/328 |
| 2010/0325416 A1* | 12/2010 | Haddad | 713/150 |
| 2011/0122815 A1* | 5/2011 | Velev et al. | 370/328 |
| 2011/0153843 A1* | 6/2011 | Hsu et al. | 709/227 |

* cited by examiner

*Primary Examiner* — Habte Mered (57) ABSTRACT

A method is disclosed that enables the transmission of media and signaling packets in a Proxy Mobile Internet Protocol-based (PMIP-based) network. A mobile access gateway is enhanced to differentiate between different types of packet traffic and to act as a Session Initiation Protocol (SIP) proxy on behalf of a mobile node. For example, the gateway is able to handle quality-of-service-sensitive (QoS-sensitive) traffic such as voice or video media packets differently from QoS-insensitive traffic such as SIP signaling packets. In the case of traffic packets that are not QoS-sensitive, the gateway engages standard PMIPv6 procedure. In the case of traffic packets that are in fact QoS-sensitive, the gateway acts as a SIP proxy for each mobile node attached to it, thereby avoiding tunneling of the packets between the gateway and the mobile node's local mobility anchor, and thereby reducing the amount of delay that affects the packets.

20 Claims, 5 Drawing Sheets

ENHANCED MOBILITY MANAGEMENT AT A MOBILE ACCESS GATEWAY

FIELD OF THE INVENTION

The present invention relates to telecommunications in general, and, more particularly, to providing enhanced mobility management at a PMIPv6 Mobile Access Gateway (MAG) that is capable of using Session Initiation Protocol (SIP).

BACKGROUND OF THE INVENTION

The development of mobile communication networks and the growth of Wireless Local Area Network-based services are driving forces behind the increase in the number of users that communicate wirelessly by using mobile stations, which are also referred to as "mobile nodes." Mobile Internet Protocol (IP) has been developed to facilitate mobility management, in particular by managing the locations of the mobile nodes and by providing communication for the mobile nodes during handover from one wireless network to another. Mobile IP advantageously allows a mobile node to transmit and receive data seamlessly while maintaining the same IP address. There are various versions of Mobile IP protocol, including Mobile IPv4 (MIPv4), MIPv6, and Proxy Mobile IPv6 (PMIPv6).

Figure 1:
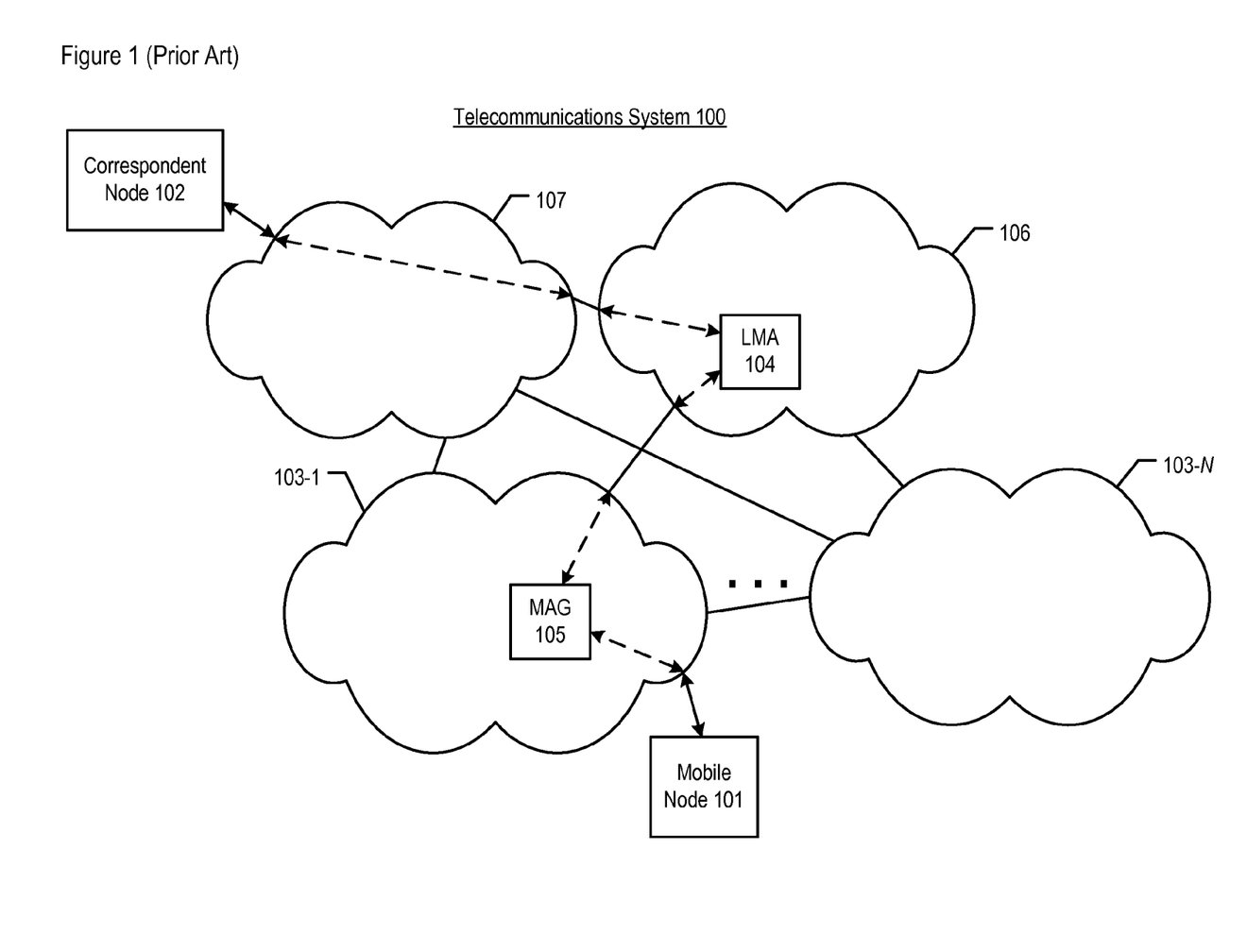
FIG. 1 depicts a schematic diagram of telecommunications system 100 in the prior art.

FIG. 1 depicts a schematic diagram of telecommunications system 100 in the prior art. System 100 comprises mobile node 101; correspondent node 102; foreign networks 103-1 through 103-N, wherein N is a positive integer; local mobility anchor (LMA) 104; mobile access gateway (MAG) 105; home network 106; and Internet network 107. The elements are interconnected as shown.

Mobile node 101 is a device that is capable of handling a telephone call, or another type of media transmission, on behalf of its user. Typically, node 101 is either a mobile device or portable device such as a cellular phone, a wireless handset, a laptop computer with or without a resident softphone, or another type of telecommunications appliance that is capable of exchanging media signals such as voice, video, and so forth. Node 101 is able to call, or be called by, another node within telecommunications system 100 such as correspondent node 102. Node 102 is another telecommunications device that is capable of exchange media signals. For example, node 101 is able to dial a telephone number that routes to node 102 and to then exchange media signals with node 102. Both mobile node 101 and corresponding node 102 are endpoints that must be IPv6-capable, but the endpoints themselves do not have to be capable of supporting mobility-related signaling protocols such as MIPv6.

Foreign network 103-n, wherein n has a value between 1 and N, inclusive, provides the connectivity between visiting mobile nodes that are attached to one or more gateways within the network, such as mobile node 101, or between an attached mobile node and a correspondent node or nodes in another network, such as correspondent node 102. The communications signals transported within network 103-n convey bitstreams of encoded media, such as audio, video, and so forth. Network 103-n comprises an Internet Protocol-based (IP-based) network for the purpose of transporting the media signals. Network 103-n comprises one or more interconnected data-processing systems such as switches, servers, routers, and gateways. These data-processing systems, and therefore network 103-n, operate in accordance with Proxy Mobile Internet Protocol, version 6 (i.e., PMIPv6).

Two of the types of data-processing systems that operate in accordance with PMIPv6 within system 100 are local mobility anchor 104 and mobile access gateway 105, the mobility access gateway that serves network 103-1 being depicted.

Local mobility anchor (LMA) 104 serves as the home agent for mobile node 101 in the proxy mobile IPv6 domain. It is the topological anchor point for node 101's home network prefix, and manages the node 101's binding state. As such, LMA 104 acts as the entry point for all traffic packets destined for mobile node 101. The presence of LMA 104 is necessary because when node 101 moves out of its home address network (i.e., network 106), mobile node 101's home address cannot be used for direct communication by another node. This is because the home address is an invalid Internet Protocol address in the visited network (i.e., network 103-1 in the case of node 101). LMA 104 receives the traffic packets with the home address of node 101 as the destination address, and then forwards those packets to the mobile access gateway with which mobile node 101 is currently attached (i.e., MAG 105).

Mobile access gateway (MAG) 105 manages the mobility-related signaling for mobile nodes (e.g., node 101) attached to the gateway's access link. MAG 105 is responsible for tracking the mobile node's movement on the access link and for signaling the mobile node's local mobility anchor (e.g., LMA 104) on behalf of the mobile node. In addition, MAG 105 establishes a "tunnel" with the local mobility anchor, in order to enable the mobile node to use an address from its home network prefix, and then emulates the mobile node's home network.

For example, when mobile node 101 first enters PMIP network 103-1 and registers, and after determining that node 101 is eligible for service, MAG 105 transmits a proxy binding update (PBU) to LMA 104, in order to inform the LMA of the new location of node 101. LMA 104 transmits a binding acknowledgment (BA) message with node 101's home-network prefix, creates a Binding Cache Entry (BCE), and sets up a bi-directional tunnel entry point. MAG 105 transmits a remote access (RA) message to node 101, in order to simulate the node's home network. Whenever LMA 104 detects packets addressed to node 101's home address, such as from correspondent node 102, the local mobility anchor intercepts those packets, encapsulates those packets, and sends them to node 101's proxy, which is at the "care-of" address assigned by MAG 105 to node 101. MAG 105 de-encapsulates each packet received and routes the packet to node 101. In handling packets originating from mobile node 101, MAG 105 acts as a default router in that all of the traffic sent from node 101 to the destination node (correspondent node 102) has to be routed through it. MAG 105 encapsulates the packets received from node 101 and transmits them to LMA 104. LMA 104 then de-encapsulates the tunneled packets and routes them to correspondent node 102.

PMIPv6 provides an improvement over previously standardized mobility management protocols such as MIPv6 and MIPv4. However, since PMIPv6 focuses only on the Internet Protocol layer, it does not take into consideration the impact of handover on the higher protocol layer applications such as real-time communications based on Session Initiation Protocol (SIP). In PMIPv6, all of the traffic is tunneled through a bi-directional tunnel when a mobile node changes its point of attachment. Although this tunneling is adequate for some non-real-time traffic such as email, the tunneling can add overhead and delay to the packets, thereby affecting quality of service and making communication that involves real-time traffic problematic.

What is needed is a technique for transmitting packets in a Proxy Mobile Internet Protocol-based network, without some of the disadvantages in the prior art.

SUMMARY OF THE INVENTION

The present invention enables the transmission of different types of packets, such as media packets and signaling packets, in a Proxy Mobile Internet Protocol-based (PMIP-based) network, without some of the disadvantages in the prior art. In particular, a mobile access gateway is enhanced to differentiate between different types of packet traffic and to act as a Session Initiation Protocol (SIP) proxy on behalf of a mobile node. In accordance with the illustrative embodiment of the present invention, the gateway is able to handle quality-of-service-sensitive (QoS-sensitive) traffic such as voice or video media packets differently from QoS-insensitive traffic such as email or SIP signaling packets.

When traffic packets arrive at the enhanced mobile access gateway, the gateway performs packet inspection followed by traffic separation. In the case of traffic packets that are not QoS-sensitive (e.g., delay-sensitive, etc.), the enhanced mobile access gateway of the illustrative embodiment engages standard PMIPv6 procedure, in order to transmit the packets through a tunnel when the transmitting mobile node is away from its home network. In the case of traffic packets that are in fact QoS-sensitive, the enhanced gateway acts as a SIP proxy for all of the mobile nodes that are attached to it, in order to avoid tunneling and the accompanying slowdown in processing that can affect the QoS-sensitive packets.

When a mobile node is out of its home network and is visiting a foreign network, the mobile node's home address (i.e., its own Internet Protocol address) cannot be used for direct communication with a correspondent node. This is because the home address is an invalid Internet Protocol address within the visited foreign network. Therefore, in accordance with the illustrative embodiment, when the mobile node initiates a Session Initiation Protocol session using its home address, the enhanced mobile access gateway changes the source address in each session packet to the care-of address that it assigned to the mobile node, and then sends the packet out. All of the SIP messages that are destined to any mobile node attached to the gateway are sent to the gateway itself, rather than to the home address of the mobile node. In turn, the enhanced gateway routes the packets to the correct mobile node.

When a mobile node moves from one enhanced mobile access gateway to another, the mobile node's home address stays the same, but the mobile node gets a new care-of address from the new gateway. If the move occurs during a call, in addition to performing a routine message exchange with the local mobility anchor (e.g., transmitting a binding update, etc.), the enhanced gateway sends either a SIP RE-INVITE message or a SIP UPDATE message to the correspondent node, in which the message contains the care-of address assigned to the mobile node by the new gateway.

In some embodiments, both the media packets and signaling packets are transmitted without the tunneling between the mobile access gateway and the local mobility anchor that is characteristic of standardized PMIPv6, while in some alternative embodiments the signaling packets are still transmitted via tunneling.

Advantageously, by basing the techniques of the illustrative embodiment at the mobile access gateway, there are no changes required at the local mobility anchor or at any other SIP component in the networks. By forcing at least some of the media packets not to be tunneled, as well as possibly some of the non-media packets, the mobile access gateway of the illustrative embodiment is able to mitigate the potential transmission and/or processing delays that are associated with some gateways in the prior art.

The illustrative embodiment of the present invention comprises: assigning, at a first mobile access gateway, a care-of address to a mobile node that is attaching to the first mobile access gateway, the mobile node also having a home address; receiving a packet having a source address and a destination address; when the source address comprises the home address of the mobile node, replacing the source address of the packet with the care-of address assigned to the mobile node, resulting in a modified packet; and transmitting the modified packet to the destination address.

DETAILED DESCRIPTION

Figure 2A:
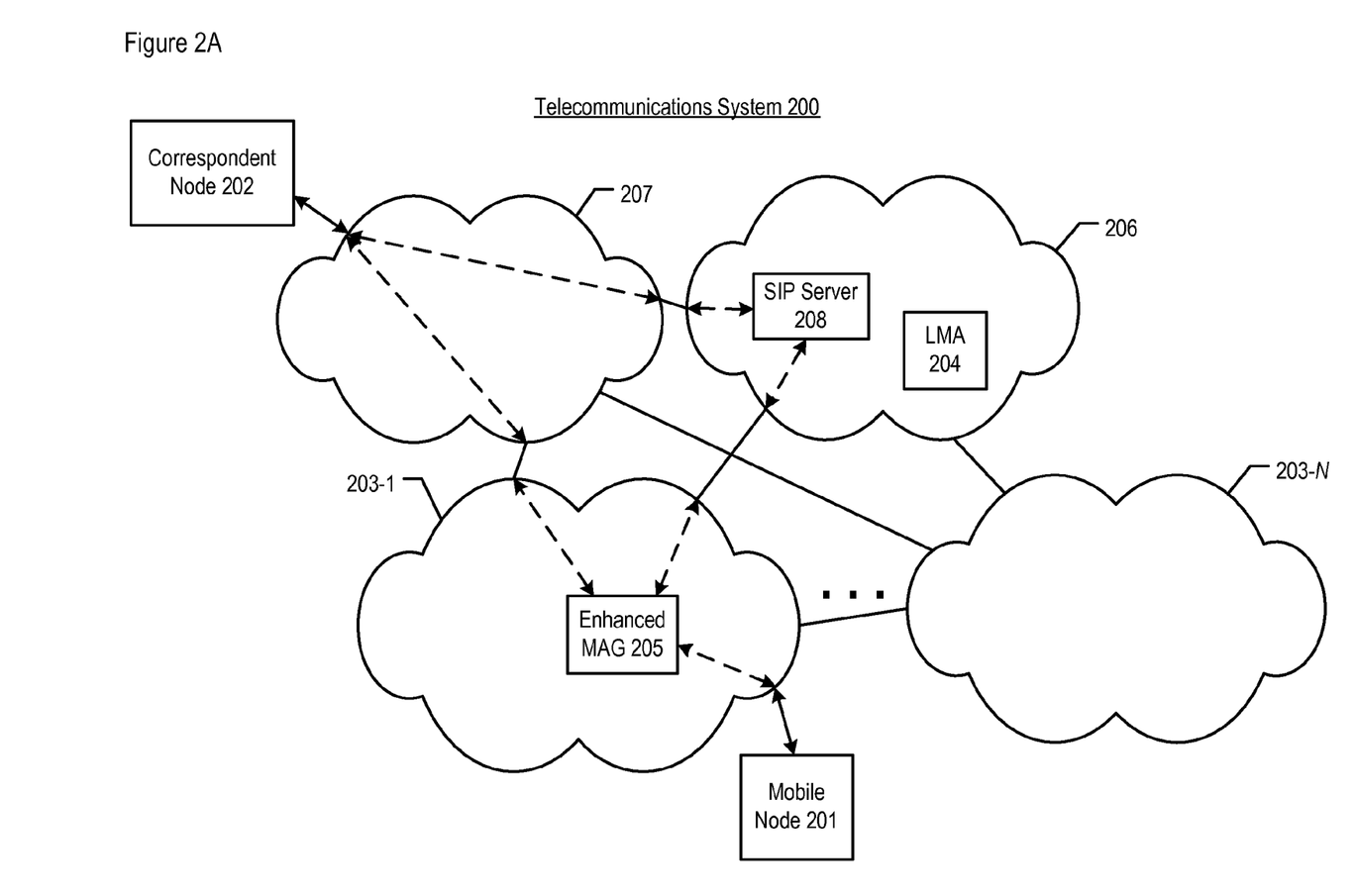
FIGS. 2A and 2B respectively depict a first and second schematic diagram of telecommunications system 200 in accordance with the illustrative embodiment of the present invention.
Figure 2B:
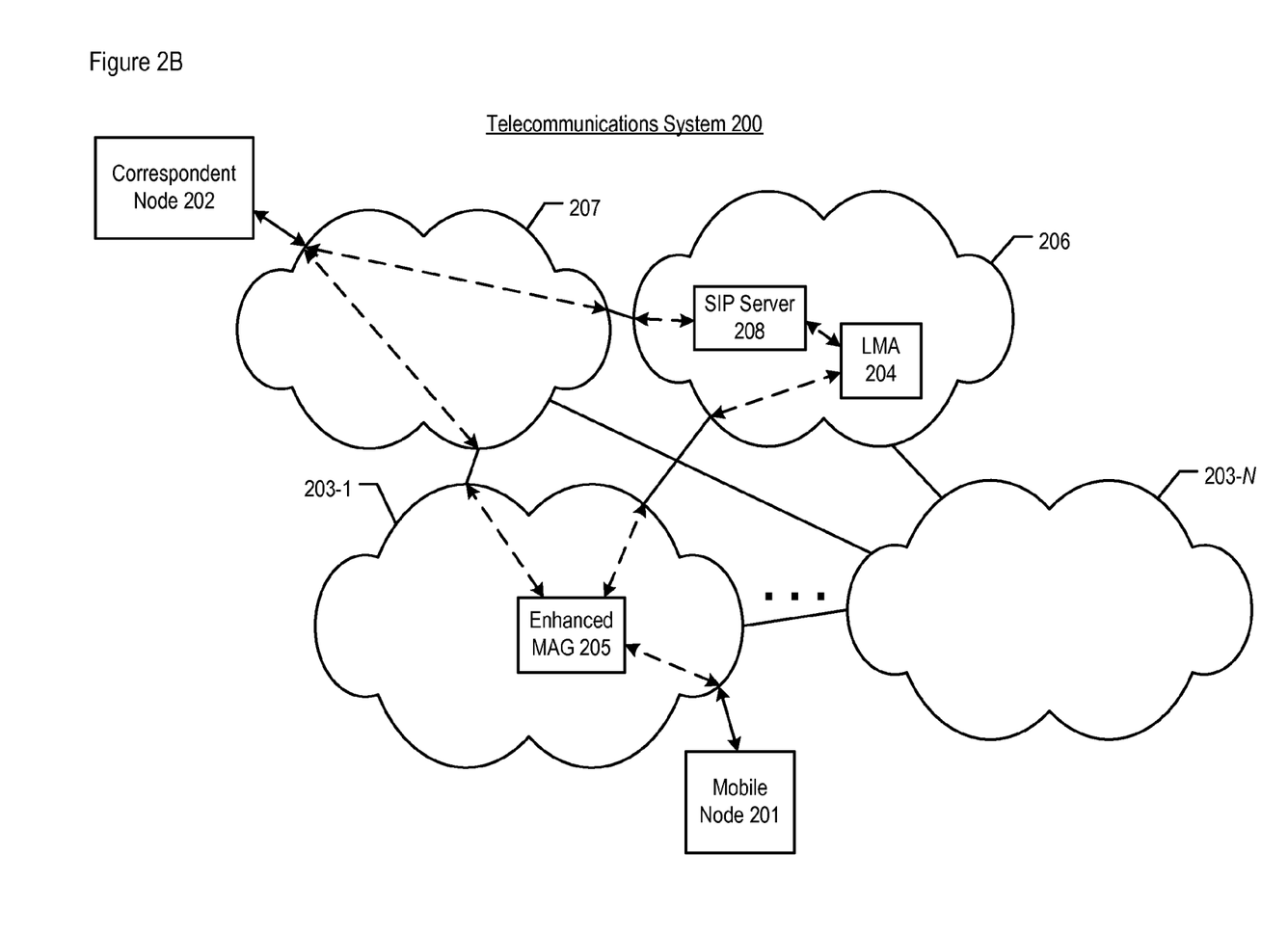

FIGS. 2A and 2B depict schematic diagrams of telecommunications system 200 in accordance with the illustrative embodiment of the present invention. System 200 comprises mobile node 201; correspondent node 202; foreign networks 203-1 through 203-N, wherein N is a positive integer; local mobility anchor (LMA) 204; enhanced mobile access gateway (MAG) 205; home network 206; Internet network 207; and Session Initiation Protocol (SIP) Server 208. The elements are interconnected as shown.

The distinction between FIGS. 2A and 2B is in the type of packet traffic that bypasses local mobility anchor 204. In FIG. 2A, local mobility anchor 204 is bypassed entirely by both the SIP signaling packets and the media packets that are exchanged between mobile node 201 and correspondent node 202, as denoted by the dashed lines. In FIG. 2B, local mobility anchor 204 is bypassed by at least some of the media packets that are exchanged between mobile node 201 and correspondent node 202, but the SIP signaling traffic still passes through the local mobility anchor. An optimized call flow corresponding to FIG. 2A is described below and with respect to FIG. 3, while an optimized call flow corresponding to FIG. 2B is described below and with respect to FIG. 4.

Mobile node 201 is a device that is capable of handling a telephone call, or another type of media transmission, on behalf of its user. In accordance with the illustrative embodiment, node 201 is a mobile device, or at least a portable device, such as a cellular phone, a wireless handset, a laptop computer with or without a resident softphone, or another type of telecommunications appliance that is capable of exchanging media signals such as voice, video, and so forth. Node 201 is able to call, or be called by, another node within telecommunications system 200 such as correspondent node 202. Node 202 is another telecommunications device that is capable of exchanging media signals. For example, node 201 is able to dial a telephone number that routes to node 202 and to then exchange media signals with node 202. Mobile node 201 is reachable via its home address, which is within the address space of the home network of node 201—that is, home network 206. Both mobile node 201 and corresponding node 202 are endpoints that must be IPv6-capable, but the endpoints themselves do not have to be capable of supporting mobility-related signaling protocols such as MIPv6 in order to operate within telecommunications system 200.

In the illustrative embodiment, mobile node 201 is a mobile or portable device. Corresponding node 202, however, can be either a mobile/portable device such as a cell phone or a non-portable device such as a landline deskset, as those who are skilled in the art will appreciate. In any event, it will be clear to those skilled in the art how to make and use mobile node 201 and corresponding node 202.

For pedagogical purposes, telecommunications system 200 features a single mobile node (i.e., node 201) that is able to communicate with a correspondent node (i.e., node 202). However, it will be clear to those skilled in the art, after reading this specification, how to make and use embodiments of the present invention to support concurrently more than one mobile node or more than one correspondent node, or both.

Also for pedagogical purposes, correspondent node 202, which represents a node with which mobile node 201 is corresponding, is shown as being associated with the Internet network 207. However, it will be clear to those skilled in the art how to make and use embodiments of the present invention in which mobile node 201 is able to correspond with one or more nodes associated with a network other than the Internet. Furthermore, as with mobile node 201, correspondent node 202 might itself be in another network than its own home network; as a result, some or all of the call flows of the illustrative embodiment might also apply to the correspondent node as if it were a mobile node attached to a mobile access gateway.

Foreign network 203-n, wherein n has a value between 1 and N, inclusive, provides the connectivity between visiting mobile nodes that are attached to one or more gateways within the network, such as mobile node 201, or between an attached mobile node and a correspondent node or nodes in another network, such as correspondent node 202. The communications signals transported within network 203-n convey bitstreams of encoded media, such as audio, video, and so forth. Network 203-n comprises the nodes and PMIPv6 functionality as described earlier and with respect to network 103-n.

Three of the types of data-processing systems that operate in accordance with PMIPv6 within system 200 are local mobility anchor 204, enhanced mobile access gateway 205, and Session Initiation Protocol (SIP) server 208, in accordance with the illustrative embodiment of the present invention. The mobility access gateway that serves network 203-1 is depicted.

Local mobility anchor 204, in some embodiments, serves as the home agent for mobile node 201 in the proxy mobile IPv6 domain, and comprises the functionality described earlier and with respect to local mobility anchor 104. It will be clear to those skilled in the art how to make and use local mobility anchor 204.

Enhanced mobile access gateway (MAG) 205 detects a mobile node's movements and initiates mobility-related signaling on behalf of the mobile node. The enhanced gateway comprises the functionality described earlier and with respect to MAG 105. In addition, the enhanced gateway performs the tasks of the illustrative embodiment described below and with respect to FIGS. 3 and 4. It will be clear to those skilled in the art, after reading this specification, how to make and use enhanced mobile access gateway 205.

Session Initiation Protocol (SIP) server 208 enables endpoint nodes, such as nodes 201 and 202, to exchange SIP messages, to register user location, and, in the case of mobile node 201, to move between networks. Server 208 enables the operators of telecommunications network 200 to install routing and security policies, authenticate users and manage user locations. Server 208 comprises one or more of proxy, redirect, and registrar server functionality, as are known in the art. In some alternative embodiments, server 208 comprises other functionality. It will be clear to those skilled in the art how to make and use SIP server 208.

An example of standardized PMIPv6 operation involving a SIP flow between two nodes is provided here. At some point in time, mobile node 201 has registered its home address with SIP server 208, and correspondent node 202 knows to contact mobile node 201 by using the home address of node 201. When correspondent node 202 wants to send SIP signaling packets to mobile 201, it contacts server 208. Server 208 continues to send data to the home address of node 201 without having to know of node 201's mobility. Whenever LMA 204 detects packets addressed to node 201's home address, such as from correspondent node 202, the LMA intercepts those packets, encapsulates those packets, and sends them to node 201's proxy, which is the "care-of" address assigned by MAG 205 to node 201. MAG 205 de-encapsulates each packet received and routes the packet to node 201. In handling SIP packets originating from mobile node 201, MAG 205 acts as a default router in that all of the traffic sent from node 201 to the destination node (correspondent node 202) has to be routed through it. MAG 205 encapsulates the packets received from node 201 and transmits them to LMA 204. LMA 204 then de-encapsulates the tunneled packets and routes them to correspondent node 202.

For pedagogical purposes, telecommunications system 200 features a single local mobility anchor (i.e., LMA 204), a single mobile access gateway (i.e., MAG 205) within foreign network 203-1, and a single SIP server (i.e., server 208) interacting with one another. However, it will be clear to those skilled in the art, after reading this specification, how to make and use embodiments of the present invention to support concurrently more than one local mobility anchor, more than one mobile access gateway (i.e., either within each foreign network 203-n or across multiple foreign networks), and/or more than one SIP server.

Furthermore, LMA 204, MAG 205, and SIP server 208 are shown as being associated with network 206, network 203-1, and network 206, respectively. However, it will be clear to those skilled in the art, after reading this specification, how to make and use embodiments of the present invention in which any or all of LMA 204, MAG 205, and SIP server 208 are associated with different networks than what is depicted.

In accordance with the illustrative embodiment, mobile node 201 and correspondent node 202 use the Session Initiation Protocol (SIP) to initiate sessions such as calls. However, it will be clear to those skilled in the art, after reading this specification, how to make and use alternative embodiments of the present invention in which a protocol other than SIP is used to initiate sessions between nodes.

Figure 3:
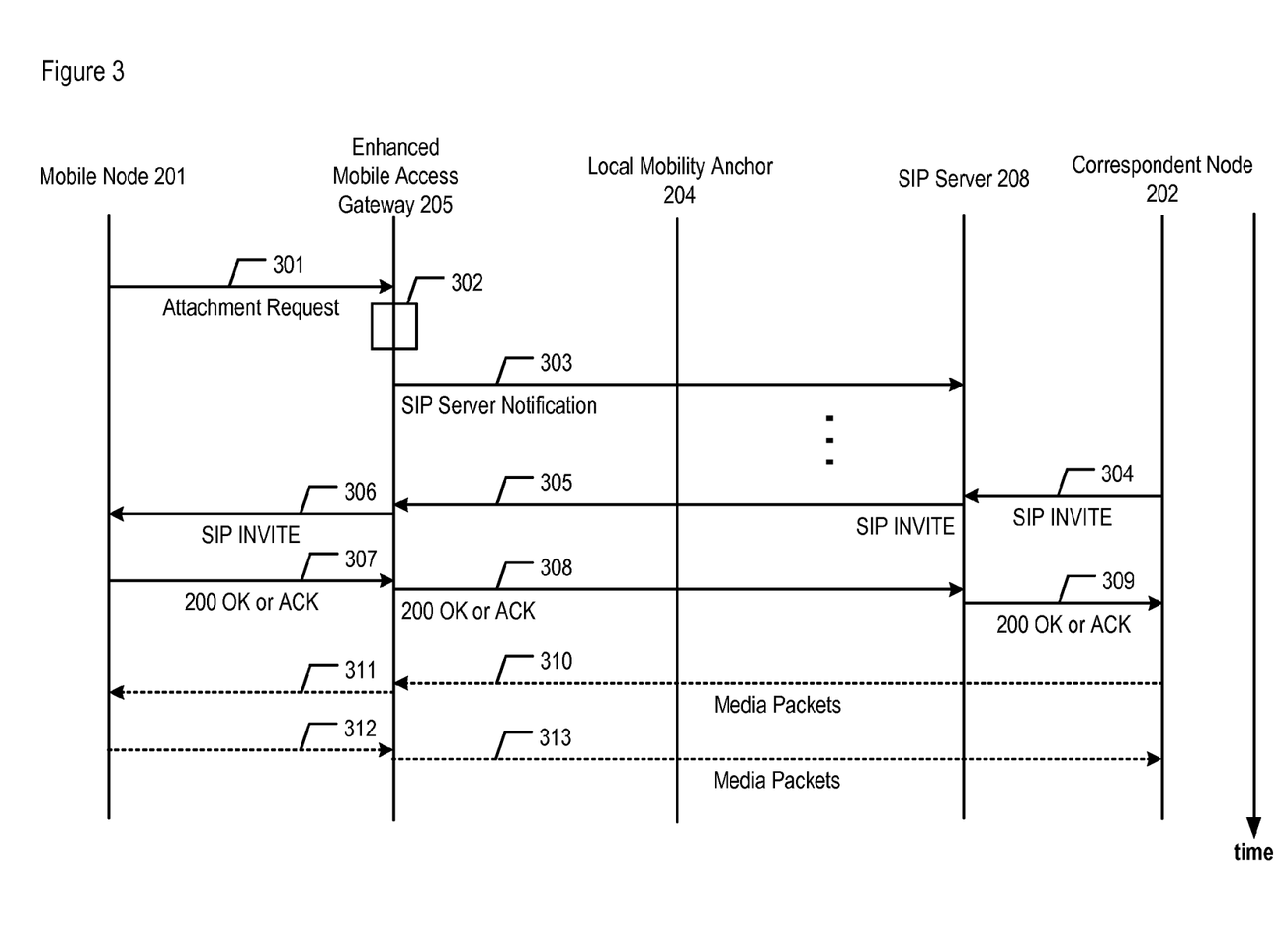
FIG. 3 depicts a first optimized call flow, in which local mobility anchor 204 is bypassed entirely, in accordance with the illustrative embodiment of the present invention.
Figure 4:
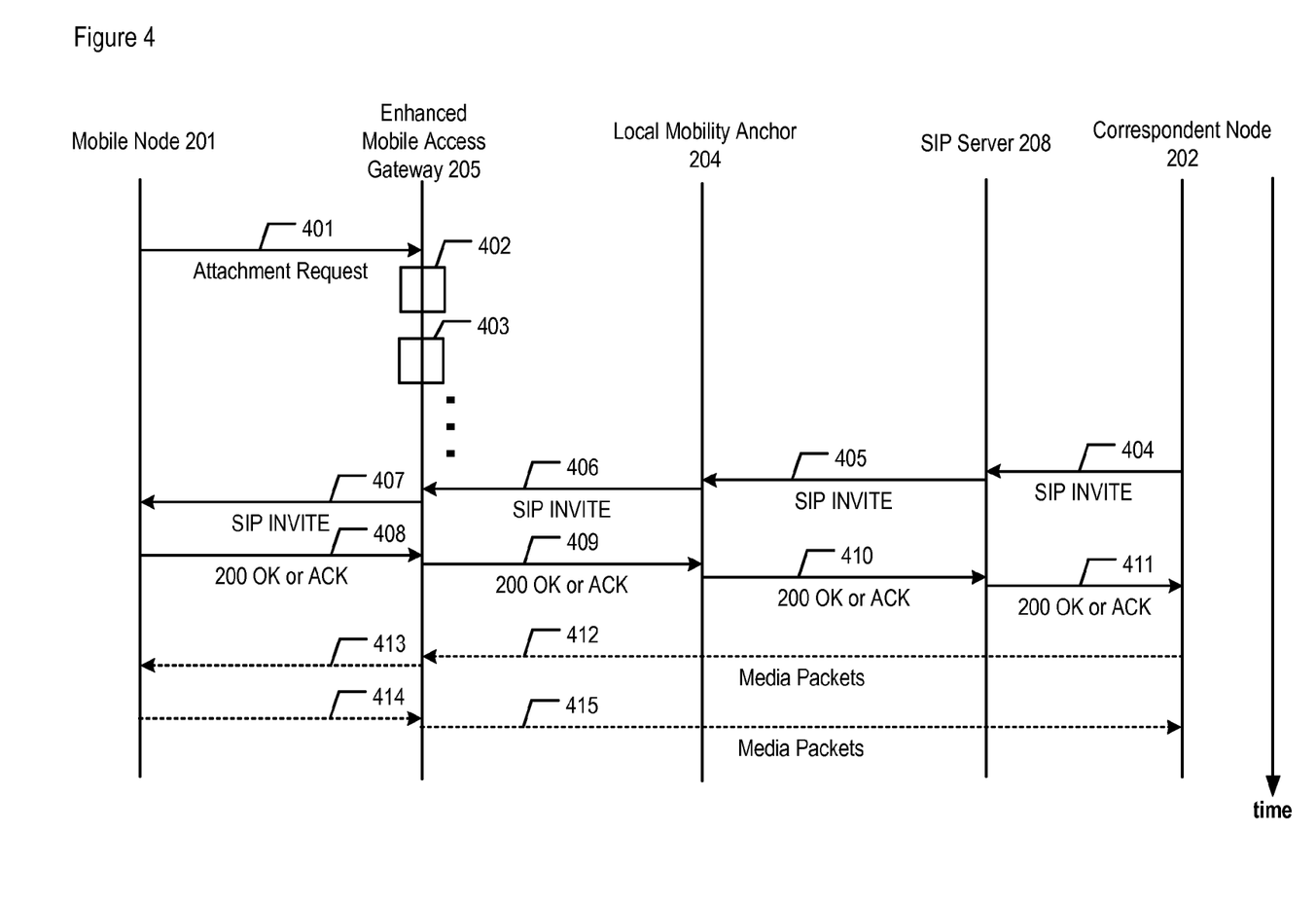
FIG. 4 depicts a second optimized call flow, in which local mobility anchor 204 is bypassed by the media packets.

FIGS. 3 and 4 depict call flows that involve mobile node 201 and correspondent node 202, in which the call flows are optimized in accordance with the illustrative embodiment of the present invention. As those who are skilled in the art will appreciate, some of the tasks that appear in the figures can be performed in parallel or in a different order than that depicted. Moreover, those who are skilled in the art will further appreciate that in some alternative embodiments of the present invention, only a subset of the depicted tasks are performed.

The salient tasks depicted in FIGS. 3 and 4 are described, for the most part, from the perspective of enhanced mobile access gateway 205 performing those tasks, in accordance with the illustrative embodiment of the present invention. As those who are skilled in the art will appreciate, in some alternative embodiments, some or all of those tasks can be performed at a different data-processing system.

FIG. 3 depicts a first optimized call flow, in which local mobility anchor 204 is bypassed entirely, with respect to both the SIP signaling packets and the media packets that are exchanged between mobile node 201 and correspondent node 202, in accordance with the illustrative embodiment of the present invention. The net effect of bypassing LMA 204 is that neither type of packet (i.e., signaling or media) is tunneled between LMA 204 and mobile access gateway 205. Correspondent node 202 is already registered with SIP server 208 in this first call flow.

At task 301, MAG 205 receives a request from node 201 to attach to the foreign network represented by network 203-1, in well-known fashion.

At task 302, MAG 205 attaches node 201 to network 203-1 in well-known fashion. Part of the attaching process comprises assigning a care-of address to node 201, in response to the receiving of the request at task 301.

In some embodiments, MAG 205 obtains one or more quality-of-service (QoS) parameters that apply to a packet or packets to be exchanged between node 201 and node 202. For the purposes of this specification and the appended claims, the quality of service parameters are defined as:
  i. bandwidth and its time derivatives, or
  ii. latency and its time derivatives (e.g., "jitter"), or
  iii. error rate and its time derivatives, or
  iv. any combination of i, ii, and iii.
For example, MAG 205 might obtain, either by receiving parameters from another device or by determining on its own, latency-related information to the effect that the end-to-end delay between nodes 201 and 202 shall not exceed 40 milliseconds.

In accordance with the illustrative embodiment, MAG 205 is enhanced with SIP processing and signaling capabilities, including separating SIP packets from non-SIP packets, modifying SIP packets, and supporting SIP signaling messages such as registration, binding update, and so forth. Accordingly at task 303, MAG 205 notifies server 208 about the new location of node 201 by sending a binding update to server 208. The binding update comprises the association of the care-of address, previously assigned at task 302, with node 201's home address.

Later, when correspondent node 202 needs to exchange SIP signaling with mobile node 201 (e.g., to make a call, etc.), MAG 205 at task 305 receives a SIP INVITE message, originated by node 202 at task 304 and forwarded by SIP server 208.

At task 306, MAG 205 forwards the received SIP INVITE message to node 201 in well-known fashion.

At task 307, MAG 205 receives a 200 OK or ACK message from node 201, with the node's home address in the session description.

At task 308, MAG 205 replaces the home address in the session description of the received message, with the care-of address that it had assigned to node 201 at task 302. MAG 205 then forwards the modified 200 OK or ACK message to server 208.

In some embodiments, the replacing of the home address at task 308 can be dependent on one or more quality-of-service parameters (e.g., the types of parameters, their values, etc.) obtained at task 302. By considering the QoS parameters, the enhanced gateway is essentially able to refine its handling of highly QoS-sensitive media traffic versus less QoS-sensitive media traffic. For example, if there is any latency parameter obtained, MAG 205 might replace the home address, but if there is no latency parameter obtained or if the latency parameter falls outside a predetermined threshold (e.g., 200 milliseconds or more, etc.), MAG 205 might not replace the home address. As those who are skilled in the art will appreciate, other combinations of quality-of-service parameter types and values can be used to determine whether to replace the home address with the care-of address.

Server 208 at task 309 then forwards the message to node 202.

Mobile node 201 and correspondent node 202 are subsequently ready to exchange media packets. At task 310, MAG 205 receives media packets transmitted from node 202. At task 311, MAG 205 forwards the received media packets to node 201.

Likewise at task 312, MAG 205 receives media packets transmitted from node 201, in which node 201 has specified i) a source address equal to its home address and ii) a destination address equal of the correspondent node's home address.

At task 313, MAG 205 replaces the home address in the source address field with the assigned care-of address in each media packet, and forwards the received media packets to node 202, in accordance with the illustrative embodiment of the present invention. In some embodiments, the replacing of the home address can be dependent on a quality-of-service parameter, as discussed above and with respect to task 308.

At some point when mobile node 201 moves out of the domain served by MAG 205, the mobile access gateway informs server 208 to remove the association between node 201's home address and the care-of address.

If node 201 moves into the domain served by a mobile access gateway (e.g., MAG 205) in the middle of the call, the new gateway sends a RE-INVITE message to correspondent node 202 on behalf of mobile node 201 with a new assigned care-of address as the new source address. The new gateway performs this in addition to conducting the routine message exchange for attaching the mobile node to the gateway.

FIG. 4 depicts a second optimized call flow, in which local mobility anchor 204 is bypassed by at least some of the media packets that are exchanged between mobile node 201 and correspondent node 202, in accordance with the illustrative embodiment of the present invention. As in the first call flow discussed above, the net effect of bypassing LMA 204 is that media packets do not tunnel between LMA 204 and mobile access gateway 205. In this second call flow, however, SIP signaling packets still tunnel between LMA 204 and MAG 205. Correspondent node 202 is already registered with SIP server 208 in this second call flow.

In accordance with the second call flow of the illustrative embodiment, media packets are not tunneled but SIP signaling packets are still tunneled. It will be clear to those skilled in the art, after reading this specification, how to make and use alternative embodiments in which the distinction is made between i) QoS-sensitive packets (e.g., voice, video, etc.) which are not tunneled and ii) QoS-insensitive packets (e.g., SIP signaling, email messages, instant messages, Short-Message Service messages, etc.) which are still tunneled. It will also be clear to those skilled in the art, after reading this specification, how to make and use alternative embodiments in which such a distinction is made based on a different type of packet classification.

At task 401, MAG 205 receives a request from node 201 to attach to the foreign network represented by network 203-1, in well-known fashion.

At task 402, MAG 205 attaches node 201 to network 203-1 in well-known fashion. Part of the attaching process comprises assigning a care-of address to node 201, in response to the receiving of the request at task 401.

In some embodiments, MAG 205 obtains one or more quality-of-service parameters that apply to a packet or packets to be exchanged between node 201 and node 202, as described above and with respect to task 302.

At task 403, MAG 205 refrains from registering with server 208, in contrast with the call flow depicted in FIG. 3. The refraining from registering has the effect of having any SIP signaling continue to be routed through local mobility anchor 204. The refraining can be performed even when a SIP-related capability has been determined at task 402 to be present.

Later, when correspondent node 202 needs to exchange SIP signaling with mobile node 202 (e.g., to make a call, etc.), MAG 205 at task 406 receives a tunneled SIP INVITE message from LMA 204, originated by node 202 at task 404 and intercepted by the local mobility anchor at task 405.

At task 407, MAG 205 forwards the received SIP INVITE message to node 201 in well-known fashion.

At task 408, MAG 205 receives a 200 OK or ACK message from node 201, with the node's home address in the session description.

At task 409, MAG 205 replaces the home address in the session description of the received message, with the care-of address that it had assigned to node 201 at task 402. In some embodiments, the replacing of the home address can be dependent on a quality-of-service parameter, as discussed above and with respect to task 308. MAG 205 then forwards the modified 200 OK or ACK message to LMA 204 via tunneling.

LMA 204 at task 410 then forwards the tunneled message to server 208, which then forwards the packet to node 202 at task 411. When correspondent node 202 receives the message, it notes the care-of address that it sees in the session description section of the message, in order to use to for a direct exchange of media packets with MAG 205.

Mobile node 201 and correspondent node 202 are subsequently ready to exchange media packets. At task 412, MAG 205 receives media packets transmitted from node 202 with the assigned care-of address specified as the destination address in each packet. At task 413, MAG 205 forwards the received media packets to node 201 based on the destination address in each packet being the care-of address of the node.

Likewise at task 414, MAG 205 receives media packets transmitted from node 201, in which node 201 has specified i) a source address equal to its home address and ii) a destination address equal to the correspondent node's home address.

At task 415, MAG 205 replaces the home address in the source address field with the assigned care-of address in each media packet, and forwards the received media packets to node 202, in accordance with the illustrative embodiment of the present invention. In some embodiments, the replacing of the home address can be dependent on a quality-of-service parameter, as discussed above and with respect to task 308.

If node 201 moves into the domain served by a mobile access gateway (e.g., MAG 205) in the middle of the call, the new gateway sends a RE-INVITE message to correspondent node 202 on behalf of mobile node 201 with a new assigned care-of address as the new source address. The new gateway performs this in addition to conducting the routine message exchange for attaching the mobile node to the gateway.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method comprising:
    assigning, at a first mobile access gateway, a care-of address to a mobile node that is attaching to the first mobile access gateway, the mobile node also having a home address;
    receiving, at the first mobile access gateway, a packet sent from the mobile node, the packet having a source address and a destination address;
    receiving, at the first mobile access gateway, a Session Initiation Protocol-related (SIP-related) message from the mobile node, wherein the SIP-related message comprises a session description, and wherein the session description comprises the home address of the mobile node;
    forwarding the SIP-related message to the destination address, with the home address in the session description replaced by the care-of address assigned to the mobile node
    when and only when the source address comprises the home address of the mobile node, replacing, at the first mobile access gateway, the source address of the packet with the care-of address assigned to the mobile node, resulting in a modified packet; and
    transmitting the modified packet to the destination address.

2. The method of claim 1 wherein the replacing of the source address is based on whether a session that the packet is part of is being handled via the Session Initiation Protocol.

3. The method of claim 1 wherein the replacing of the source address is based on a quality-of-service parameter.

4. The method of claim 3 wherein the quality-of-service parameter is related to latency.

5. The method of claim 1 further comprising transmitting, from the first mobile access gateway to a server, a message that associates the care-of address with the home address of the mobile node.

6. The method of claim 5 wherein the transmitting of the message occurs before the transmitting of any modified packet within a single session.

7. The method of claim 1 wherein the destination address comprises the home address of a correspondent node with which the mobile node is communicating, wherein the correspondent node is attached to a second mobile access gateway.

8. A method comprising:
    receiving, at a mobile access gateway, a request from a mobile node to attach to a Proxy Mobile Internet Protocol-based network;
    assigning a care-of address to the mobile node, in response to the receiving of the request;
    transmitting, to a server, a message that associates the care-of address with the home address of the mobile node, in response to the assigning of the care-of address;
    receiving, at the mobile access gateway and subsequent to the transmitting of the message that associates, a Session Initiation Protocol (SIP) INVITE message originated by a correspondent node;
    forwarding the SIP INVITE message received to the mobile node;
    receiving, at the mobile access gateway, a SIP-related message from the mobile node in response to the SIP INVITE message, wherein the SIP-related message comprises a session description, and wherein the session description comprises the home address of the mobile node; and forwarding the SIP-related message to the correspondent node, with the home address in the session description replaced by the care-of address assigned to the mobile node.

9. The method of claim 8 wherein the SIP-related message is one of a 200 OK message and an ACK message.

10. The method of claim 8 further comprising:
receiving, at the mobile access gateway, a media packet originated by the correspondent node; and
when the destination address of the media packet comprises the care-of address assigned to the mobile node, forwarding the media packet to the mobile node.

11. The method of claim 8 further comprising:
receiving, at the mobile access gateway, a media packet originated by the mobile node; and
when both the source address of the media packet comprises the home address of the mobile node, and the destination address of the media packet comprises the address of the correspondent node, forwarding the media packet to the correspondent node, with the home address replaced by the care-of address assigned to the mobile node.

12. The method of claim 8 wherein the transmitting of the message that associates is based on the type of media to be transmitted between the mobile node and a correspondent node.

13. A method comprising:
assigning, at a first mobile access gateway, a care-of address to a mobile node that is attaching to the first mobile access gateway, the mobile node also having a home address;
transmitting, from the first mobile access gateway, a message that associates the care-of address with the home address of the mobile node;
receiving a packet sent from the mobile node, the packet having a source address and a destination address;
receiving, at the mobile access gateway, a Session Initiation Protocol (SIP) INVITE message originated by a correspondent node; and
forwarding the SIP INVITE message received to the mobile node;
receiving, at the mobile access gateway, a SIP-related message from the mobile node in response to the SIP INVITE message, wherein the SIP-related message comprises a session description, and wherein the session description comprises the home address of the mobile node; and
forwarding the SIP-related message to the correspondent node, with the home address in the session description replaced by the care-of address assigned to the mobile node; and
transmitting the packet to the destination address after having replaced, at the first mobile access gateway, the source address of the packet with the care-of address assigned to the mobile node.

14. The method of claim 13 further comprising:
receiving, at the mobile access gateway, a media packet originated by the correspondent node; and
when the destination address of the media packet comprises the care-of address assigned to the mobile node, forwarding the media packet to the mobile node.

15. The method of claim 13 further comprising:
receiving, at the mobile access gateway, a media packet originated by the mobile node; and when both the source address of the media packet comprises the home address of the mobile node, and the destination address of the media packet comprises the address of the correspondent node, forwarding the media packet to the correspondent node, with the home address replaced by the care-of address assigned to the mobile node.

16. A method comprising:
assigning, at a first mobile access gateway, a care-of address to a mobile node that is attaching to the first mobile access gateway, the mobile node also having a home address;
receiving, at the first mobile access gateway, a Session Initiation Protocol-related (SIP-related) message from the mobile node, wherein the SIP-related message comprises a session description, and wherein the session description comprises the home address of the mobile node; and
forwarding the SIP-related message to the destination address, with the home address in the session description replaced by the care-of address assigned to the mobile node;
receiving a packet having a source address and a destination address;
when and only when the source address comprises the home address of the mobile node, replacing the source address of the packet with the care-of address assigned to the mobile node, resulting in a modified packet; and
transmitting the modified packet to the destination address.

17. The method of claim 16 wherein the destination address comprises the home address of a correspondent node with which the mobile node is communicating, wherein the correspondent node is attached to a second mobile access gateway.

18. A method comprising:
assigning, at a first mobile access gateway, a care-of address to a mobile node that is attaching to the first mobile access gateway, the mobile node also having a home address;
transmitting, from the first mobile access gateway, a message that associates the care-of address with the home address of the mobile node;
receiving, at the mobile access gateway, a Session Initiation Protocol (SIP) INVITE message originated by a correspondent node;
forwarding the SIP INVITE message received to the mobile node;
receiving, at the mobile access gateway, a SIP-related message from the mobile node in response to the SIP INVITE message, wherein the SIP-related message comprises a session description, and wherein the session description comprises the home address of the mobile node;
forwarding the SIP-related message to the correspondent node, with the home address in the session description replaced by the care-of address assigned to the mobile node;
receiving a packet having a source address and a destination address;
and transmitting the packet to the destination address after having replaced the source address of the packet with the care-of address assigned to the mobile node.

19. The method of claim 18 further comprising:
receiving, at the mobile access gateway, a media packet originated by the correspondent node; and
when the destination address of the media packet comprises the care-of address assigned to the mobile node, forwarding the media packet to the mobile node.

20. The method of claim 18 further comprising:
receiving, at the mobile access gateway, a media packet originated by the mobile node; and
when both the source address of the media packet comprises the home address of the mobile node, and the destination address of the media packet comprises the address of the correspondent node, forwarding the media packet to the correspondent node, with the home address replaced by the care-of address assigned to the mobile node.

* * * * *